(12) United States Patent
Wright, III et al.

(10) Patent No.: US 6,281,473 B1
(45) Date of Patent: Aug. 28, 2001

(54) APPARATUS AND METHOD FOR CONTROLLING CONFINEMENT MEDIA THICKNESS IN LASER SHOCK PEENING

(75) Inventors: P. Kennard Wright, III; Seetharamaiah Mannava, both of Cincinnati; Terry H. Jones, Morrow, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/487,857

(22) Filed: Jan. 19, 2000

(51) Int. Cl.$^7$ .................................................. B23K 26/00
(52) U.S. Cl. ................... 219/121.84; 219/121.85; 219/121.61; 219/121.62; 148/565
(58) Field of Search .................. 219/121.84, 121.73, 219/121.85, 211.61, 121.65, 121.66, 121.62; 148/525, 565

(56) References Cited

U.S. PATENT DOCUMENTS

| | | | |
|---|---|---|---|
| 5,741,559 | * 4/1998 | Dulaney | 427/554 |
| 5,744,781 | * 4/1998 | Yeaton | 219/121.84 |
| 5,932,120 | * 8/1999 | Mannava et al. | 219/121.85 |
| 6,049,058 | * 4/2000 | Dulaney et al. | 219/121.84 |
| 6,057,003 | * 5/2000 | Dulaney et al. | 427/457 |

* cited by examiner

*Primary Examiner*—M. Alexandra Elve
(74) *Attorney, Agent, or Firm*—Andrew C. Hess; Gerry S. Gressel (57) ABSTRACT

A laser shock peening system includes an apparatus and method that senses a thickness of laser transparent confinement media flow, such as water. In one embodiment, the apparatus indicates a proper thickness, in another embodiment, the apparatus controls the flow rate of the confinement media using signals from probes of the apparatus. A first probe is used to sense a predetermined minimum thickness and another embodiment further includes a second probe to indicate a predetermined maximum thickness of the confinement media.

19 Claims, 7 Drawing Sheets

FIG. 8

APPARATUS AND METHOD FOR CONTROLLING CONFINEMENT MEDIA THICKNESS IN LASER SHOCK PEENING

BACKGROUND OF THE INVENTION

1. Field of the Invention

This invention relates to laser shock peening and, more particularly, to apparatus and method for controlling the flow of water or other confinement media over the laser shocked area of the workpiece during a laser shock peening process.

2. Description of Related Art

Laser shock peening or laser shock processing, as it is also referred to, is a process for producing a region of deep compressive residual stresses imparted by laser shock peening a surface area of a workpiece. Laser shock peening typically uses one or more radiation pulses, from high power pulsed lasers, to produce an intense shock wave at the surface of a workpiece similar to methods disclosed in U.S. Pat. No. 3,850,698 entitled "Altering Material Properties"; U.S. Pat. No. 4,401,477 entitled "Laser Shock Processing"; and U.S. Pat. No. 5,131,957 entitled "Material Properties". Laser shock peening, as understood in the art and as used herein, means utilizing a pulsed laser beam from a laser beam source to produce a strong localized compressive force on a portion of a surface by producing an explosive force at the impingement point of the laser beam by the instantaneous ablation or vaporization of a thin layer of that surface or of a coating (such as tape or paint) on that surface.

Laser shock peening is being developed for many applications in the gas turbine engine field, some of which are disclosed in the following U.S. Pat. No. : 5,756,965 entitled "On The Fly Laser Shock Peening"; U.S. Pat. No. 5,591,009 entitled "Laser shock peened gas turbine engine fan blade edges"; U.S. Pat. No. 5,569,018 entitled "Technique to prevent or divert cracks"; U.S. Pat. No. 5,531,570 entitled "Distortion control for laser shock peened gas turbine engine compressor blade edges"; U.S. Pat. No. 5,492,447 entitled "Laser shock peened rotor components for turbomachinery"; U.S. Pat. No. 5,674,329 entitled "Adhesive tape covered laser shock peening", all of which are assigned to the present Assignee.

Laser peening has been utilized to create a compressively stressed protective layer at the outer surface of a workpiece which is known to considerably increase the resistance of the workpiece to fatigue failure as disclosed in U.S. Pat. No. 4,937,421 entitled "Laser Peening System and Method". These methods typically employ a curtain of water flowed over the workpiece or some other method to provide a plasma confining medium. This medium enables the plasma to rapidly achieve shockwave pressures that produce the plastic deformation and associated residual stress patterns that constitute the LSP effect. The curtain of water provides a confining medium, to confine and redirect the process generated shock waves into the bulk of the material of a component being LSP'D, to create the beneficial compressive residual stresses. This confining medium also serves as a carrier to remove process generated debris and any unused laser beam energy. Water is an ideal confining medium since it is transparent to the ND:YAG beam wavelength and is easy to implement in production. The water curtain should be kept in continuous contact with the surface of the workpiece or part being LSP'D and at a minimum predetermined thickness or in a range of thicknesses. The water curtain often must be kept at a depth greater than 20 mils.

This water curtain serves the purpose of confining the plasma formed at the top surface of the ablative medium so that the shock wave is driven inward into the metal and not dissipated outward into the air. Within a range of water thickness from about 0 to 80 mil, the effectiveness of the shock wave in the metallic workpiece increases as the water layer thickness increases. Thus, it is important to monitor and control the water thickness at all times during processing so that adequate coverage and thickness is achieved. This can be difficult to do since the workpiece being laser shock peened must be isolated from the operators for safety purposes, and the workpieces typically have complex shapes which preclude many thickness gages. Furthermore, the water flow is dynamic with potentially varying flow rate or pressure.

SUMMARY OF THE INVENTION

A laser shock peening apparatus for laser shock peening a metallic surface portion on a workpiece through a laser transparent confinement media includes a laser unit having at least one laser beam source for generating at least one laser beam and a means for directing the beam through the confinement media to the surface portion on the workpiece. A confinement media supply means is used flowing the confinement media over the surface portion and a sensor means is provided for sensing a thickness of the confinement media on the surface portion. One embodiment of the invention provides an indicating means connected to the sensor means to indicate the thickness of the confinement media and another embodiment provides a control means for controlling the laser shock peening based on a sensed thickness signal from the sensor means which is connected to the control means.

The confinement media supply means in a more particular embodiment of the invention further includes a control valve controllably connected to the control means for controlling flow rate of the confinement media through the confinement media supply means based on the sensed thickness from the sensor means.

One embodiment of the sensor means includes a first probe that is operable to sense a first thickness of the confinement media and is connected to the control means for controlling flow rate of the confinement media through the confinement media supply means based on a first signal from the first probe. In a more particular embodiment, the sensor means includes a first circuit having within it the first probe, which is an electrical conductor, connected to an electrical power supply. The circuit further includes the confinement media supply means and an electrical connection means for connecting the workpiece into the circuit such that the circuit is completed when the confinement media is flowed over the surface portion and contacts the first probe. Another embodiment provides the sensor means with first and second sensors operable to sense first and second thicknesses, respectively, of the confinement media. In a yet more particular embodiment, the control means is operable for controlling flow rate of the confinement media through the confinement media supply means based on first and second signals from the first and second sensors.

The invention includes a method for laser shock peening a workpiece by firing a laser beam with sufficient power to vaporize material on a surface portion of the workpiece to form a region having deep compressive residual stresses imparted by the laser shock peening process extending into the workpiece from the laser shock peened surface portion, while flowing laser transparent confinement media over the surface portion upon which the laser beam is firing and sensing a thickness of the confinement media on the surface portion. One embodiment of the invention includes indicating the thickness of the confinement media if it is below a predetermined first value. Another embodiment includes controlling the laser shock peening using the sensed thickness of the confinement media such as by controlling a flow rate of the confinement media over the surface portion.

In a more particular embodiment, the sensing of the thickness of the confinement media includes using a first probe to indicate a predetermined minimum thickness of the confinement media, while a more particular embodiment further includes using a second probe to indicate a predetermined maximum thickness of the confinement media.

The present invention provides an accurate and automatic method to measure and indicate or control the thickness of the flow of confinement media used in laser shock peening processes. This helps eliminate rework for parts that may result in lower than acceptable or desired HCF capability.

The method of the present invention can be used for real time in situ measurement and control of confinement media flow thickness. It allows monitoring and control of the confinement media thickness at all times during laser shock peening processing so that adequate coverage and thickness is achieved. It allows this to be done while the operators are isolated from the workpiece and the process for safety purposes. Furthermore, the invention allows for the water flow being dynamic with potentially varying flow rate or pressure.

DETAILED DESCRIPTION OF THE INVENTION

Figure 1:
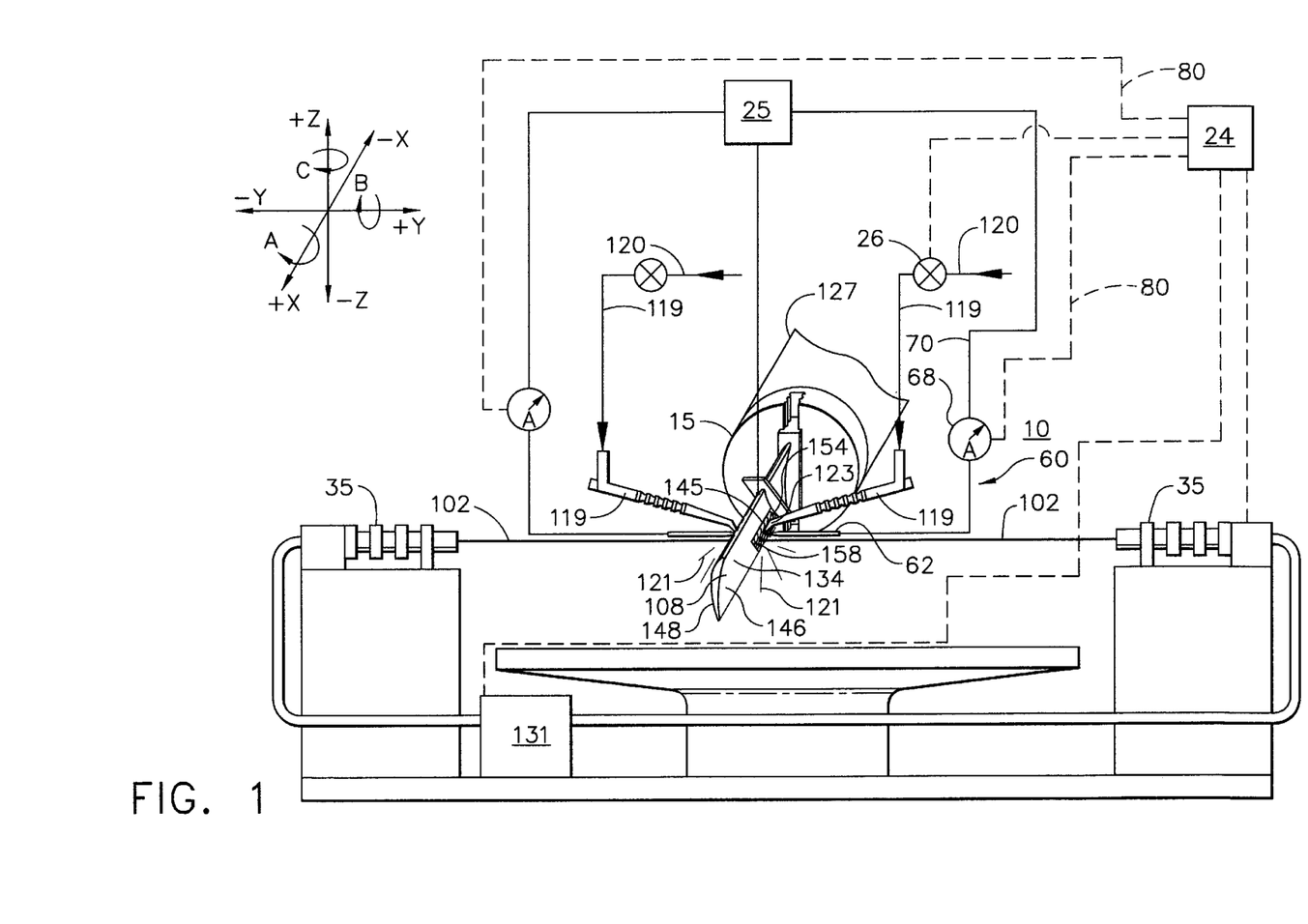
FIG. 1 is a partial perspective schematic illustration of a laser shock peening apparatus and method in accordance with a first exemplary embodiment of the present invention.
Figure 2:
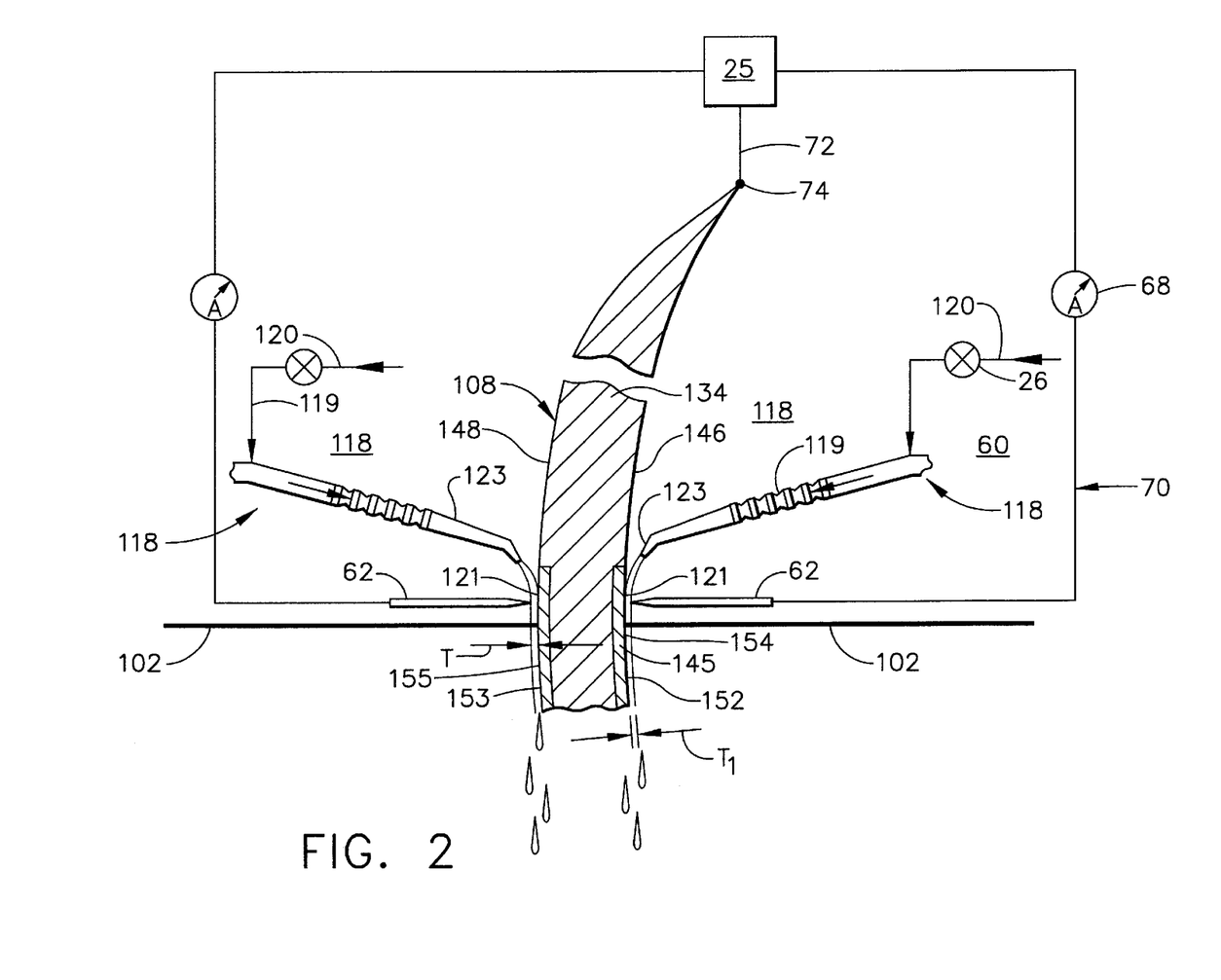
FIG. 2 is an enlarged partially diagrammatic and partially schematic illustration of apparatus to measure and control thickness of the flow of water in the laser shock peening apparatus and method illustrated in FIG. 1.
Figure 3:
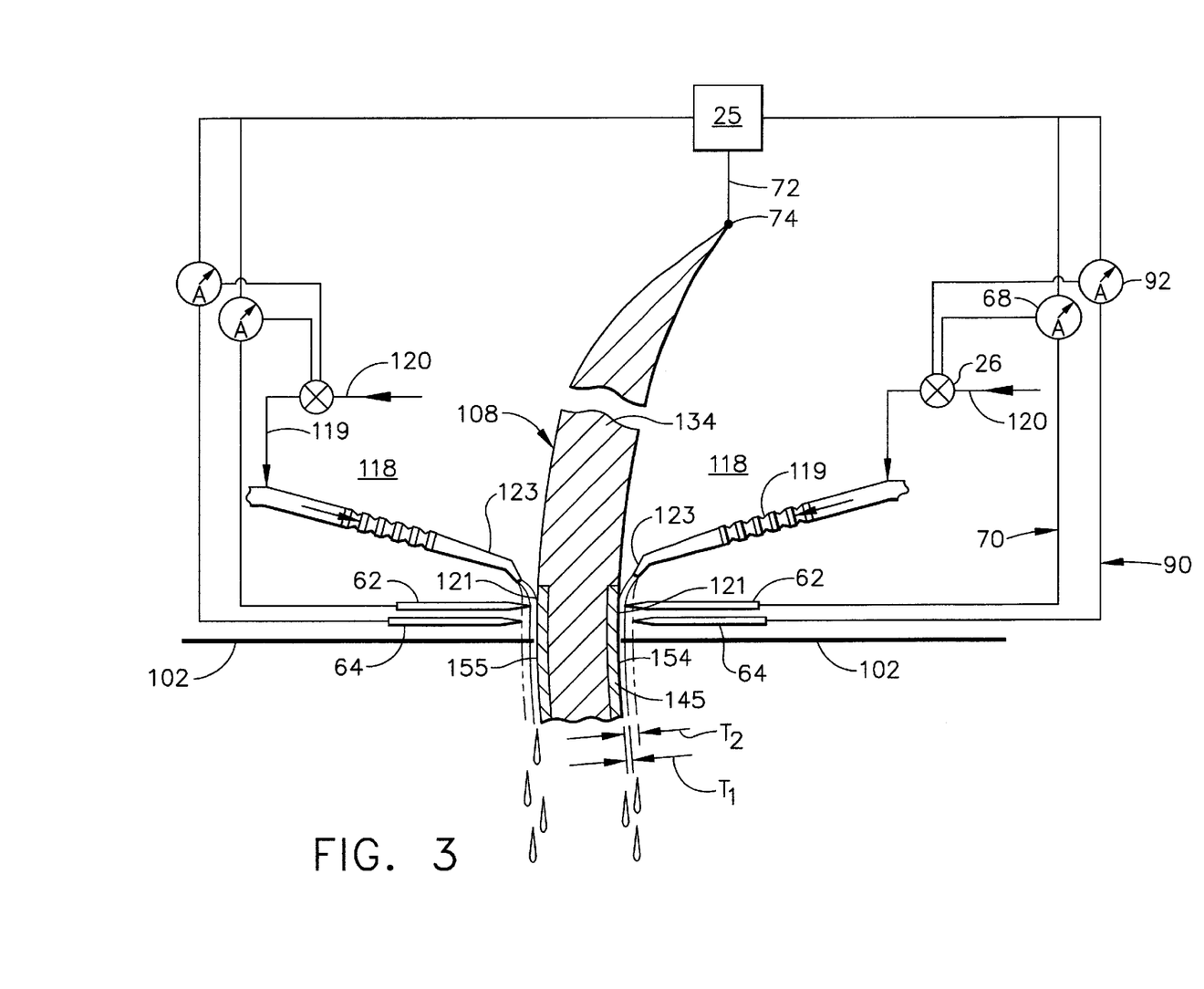
FIG. 3 is an enlarged partially diagrammatic and partially schematic illustration of an alternative embodiment of apparatus to measure and control thickness of the flow of water in the laser shock peening apparatus and method illustrated in FIG. 1.
Figures 4, 5:
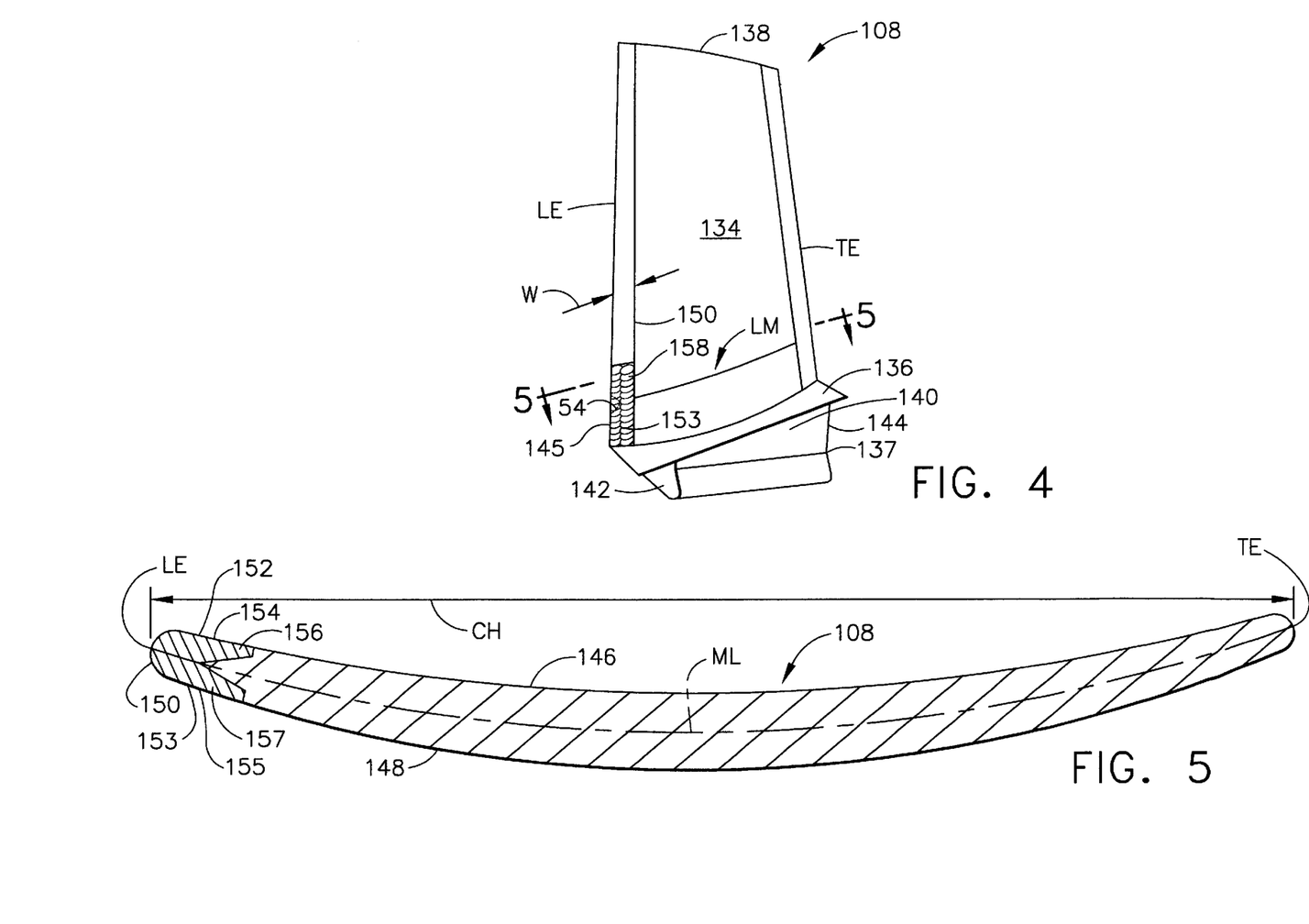
FIG. 4 is a perspective view of the fan blade in FIG. 1.
FIG. 5 is a cross-sectional view of the fan blade taken through line 5—5 in FIG. 4.

Illustrated in FIG. 1 is a schematic illustration of laser shock peening system 10 that is used to laser shock peen production and test workpieces exemplified by the blade 108 having an airfoil 134 with a patch 145 that is to be laser shock peened. The blade 108 is mounted in a fixture 15 which is attached to a five-axis computer numerically controlled (CNC) manipulator 127, one of which is commercially available from the Huffman Corporation, having an office at 1050 Huffman Way, Clover, S.C. 29710. The five axes of motion that are illustrated in the exemplary embodiment are conventional translational axes X, Y, and Z, and conventional first, second, and third rotational axes A, B, and C, respectively, that are well known in CNC machining. The manipulator 127 is used to continuously move and position the blade to provide "on the fly" laser shock peening. Laser shock peening may be done in a number of various ways using paint or tape as an ablative medium (see in particular U.S. Pat. No. 5,674,329 entitled "Adhesive Tape Covered Laser Shock Peening"). The laser shock peening system 10 is illustrated as having a conventional generator 131 with an oscillator, a pre-amplifier, and a beam splitter which feeds the pre-amplified laser beam into two beam optical transmission circuits each having first and second amplifiers. Optics 35 include optical elements including mirrors and lenses that transmit and focus the laser beam 102 on first and second laser shock peening surfaces 154 and 155 which is shown in FIGS. 2, 3, and 5 (see U.S. Pat. No. 5,756,965 and other Laser Shock Peening patents listed above for more details). A controller 24 is used to monitor and/or control the laser shock peening system 10 including the movement of the manipulator 127 and optionally the firing of the laser beams 102.

Referring to FIGS. 4 and 5, the blade 108 includes an airfoil 134 extending radially outward from a blade platform 136 to a blade tip 138. The blade 108 includes a root section 140 extending radially inward from the platform 136 to a radially inner end 137 of the root section 140. At the radially inner end 137 of the root section 140 is a blade root 142 which is connected to the platform 136 by a blade shank 144. The airfoil 134 extends in the chordwise direction between a leading edge LE and a trailing edge TE of the airfoil. A chord CH of the airfoil 134 is the line between the leading edge LE and trailing edge TE at each cross-section of the blade as illustrated in FIG. 5. The airfoil 134 further includes a pressure side 146 and a suction side 148 is on the other side of the airfoil. A mean-line ML is generally disposed midway between the two sides in the chordwise direction.

The leading edge section 150 of the blade 108 extends along the leading edge LE of the airfoil 134 from the blade platform 136 to the blade tip 138. The leading edge section 150 includes a predetermined width W such that the leading edge section 150 encompasses an area where nicks 54 (shown in phantom) and tears that may occur along the leading edge of the airfoil 134 during engine operation. The airfoil 134 subject to a significant tensile stress field due to centrifugal forces generated by the blade 108 rotating during engine operation. The airfoil 134 is also subject to vibrations generated during engine operation and the nicks and tears operate as high cycle fatigue stress risers producing additional stress concentrations around them.

To counter fatigue failure of portions of the blade along possible crack lines that can develop and emanate from the nicks and tears the laser shock peened patch 145 is placed along a portion of the leading edge LE where incipient nicks and tears may cause a failure of the blade due to high cycle fatigue. The laser shock peened patch 145 is placed along a portion of the leading edge LE where an exemplary predetermined first mode line LM of failure may start for a fan or compressor blade. Within the laser shock peened patch 145, at least one and preferably, both the pressure side 146 and the suction side 148 are simultaneously laser shock peened to form oppositely disposed first and second laser shock peened surface portions 152 and 153 and pre-stressed blade regions 156 and 157, respectively, having deep compressive residual stresses imparted by laser shock peening (LSP) extending into the airfoil 134 from the laser shock peened surface portions. The pre-stressed blade regions 156 and 157 are illustrated along only a portion of the leading edge section 150 but may extend along the entire leading edge LE or longer portion thereof if so desired.

Referring to FIGS. 1 and 2, laser beams 102 are arranged to simultaneously laser shock peen longitudinally spaced apart opposite convex suction and concave pressure sides 148 and 146, respectively, along a leading edge LE of an airfoil 134 of the blade 108 within the patch 145. The convex suction and concave pressure sides 148 and 146 have the first and second laser shock peened surface portions 152 and 153, respectively, within the patch 145 on opposite sides of the blade 108. The first and second laser shock peened surface portions 152 and 153, respectively, are covered with an ablative coating such as paint or adhesive tape to form a coated surface as disclosed in U.S. Pat. Nos. 5,674,329 and 5,674,328. The paint and tape provide an ablative medium over which is placed a clear confinement media which is typically a clear fluid curtain such as a flow of water 121.

The blade 108 is continuously moved during the laser shock peening process, while the laser shock peening system 10 is used to continuously fire stationary high power laser beams 102 through the curtain of flowing water 121 on the coated first and second laser shock peened surface portions 152 and 153 forming spaced apart laser shock peening spots 158. The curtain of water 121 is supplied by a confinement media supply means generally shown at 118 as exemplified by a water nozzle 123 at the end of a water line 119 connected to a water supply pipe 120. The water nozzle 123 flows a stream 135 of water on the first and second laser shock peened surface portions 152 and 153 to form the curtain of water 121.

A sensor means or sensing apparatus 60 and method is used to sense if a thickness T of the flow of water 121, or other clear confinement media, has at least a desired minimum thickness T1 illustrated in FIG. 2 and, if so desired, not more than a maximum thickness T2 as illustrated in FIG. 3. For simultaneous dual sided laser shock peening two sensing apparatuses 60 are used, one for each of the first and second oppositely disposed laser shock peened surface portions 152 and 153.

Illustrated in FIGS. 1 and 2 is a first exemplary embodiment of the invention, wherein the sensing apparatus 60 has a minimum level probe 62 for sensing a thickness T (typically about 0.02 inches) of the curtain of flowing water 121. The minimum level probe 62 is spaced apart from the first laser shock peening surface portion 152 within the patch 145 a distance substantially equal to the predetermined minimum thickness T1. The sensing apparatus 60 incorporates an indicator means exemplified by a first ammeter 68 to indicate to an operator of the laser system 10 that the thickness T of the curtain of flowing water 121 has fallen below the predetermined minimum thickness T1. A first circuit 70 has within it the minimum level probe 62, which in the exemplary embodiment is an electrical conductor, connected to an electrical power supply 25 and the first ammeter 68. The first circuit 70 further includes an electrical connection means illustrated as a cable 72 and clip 74 connecting the airfoil 134 of the blade 108 into the circuit such that the circuit is completed when the curtain of flowing water 121 (the confinement media) is flowed over the first laser shock peening surface portion 152 and contacts the first probe. In the exemplary embodiments illustrated herein, the ammeter is used to show a completed circuit and indicate the completed circuit to the operator. Other indicator means can be used such as lights or other visual devices or buzzers or audible alarm or other audio devices or a combination of visual and audio devices. The operator can view the first ammeter 68 to see if the curtain of flowing water 121 becomes too thin (less than T1) to complete the circuit and the ammeter reading falls to zero, thus, indicating an insufficient water level or thickness T of the curtain of flowing water 121.

Alternative embodiments of the invention provide, either together with or without the indicator means, a control means such as the controller 24 operable for controlling the laser shock peening process based on a sensed thickness signal from the sensor means which is connected to the control means as illustrated by signal lines 80 leading from the first ammeter 68 to the controller 24. More particularly, a flow valve 26 in the water supply pipe 120 is controllably connected to the controller 24 and is used to control the flow rate of water through the nozzle 123 based on the sensed thickness signal from the sensor means.

In one embodiment, the sensing apparatus 60 incorporates the 15 minimum level probe 62 for sensing a minimum thickness T1 of the curtain of flowing water 121 and a maximum level probe 64 for sensing the maximum thickness T2 as illustrated in FIG. 3 so as to maintain the thickness T of the curtain of flowing water 121 in a range between the desired minimum thickness T1 and the maximum thickness T2. The controller 24 can be used in this way to provide automatic shut down or correction of the laser shock peening process if insufficient thickness of the curtain of flowing water 121 is detected.

Further illustrated in FIG. 3 is a second circuit 90 independent of the first circuit 70 and having within it maximum level probe 64 which is an electrical conductor connected to an electrical power supply 25 and a second ammeter 92. The second circuit 90 further includes the cable 72 and the clip 74 connecting the airfoil 134 of the blade 108 into the second circuit such that the second circuit is completed when the curtain of flowing water 121 (the confinement media) is flowed over the first laser shock peening surface portion 152 and contacts the second probe which is the maximum level probe 64. The operator can view the first and second ammeters 68 and 92 to see if the curtain of flowing water 121 becomes too thin (less than T1) or too thick (greater than T2). A non-zero reading on the second ammeter 92 would indicate an overly thick water level or thickness T of the curtain of flowing water 121.

Figure 6:
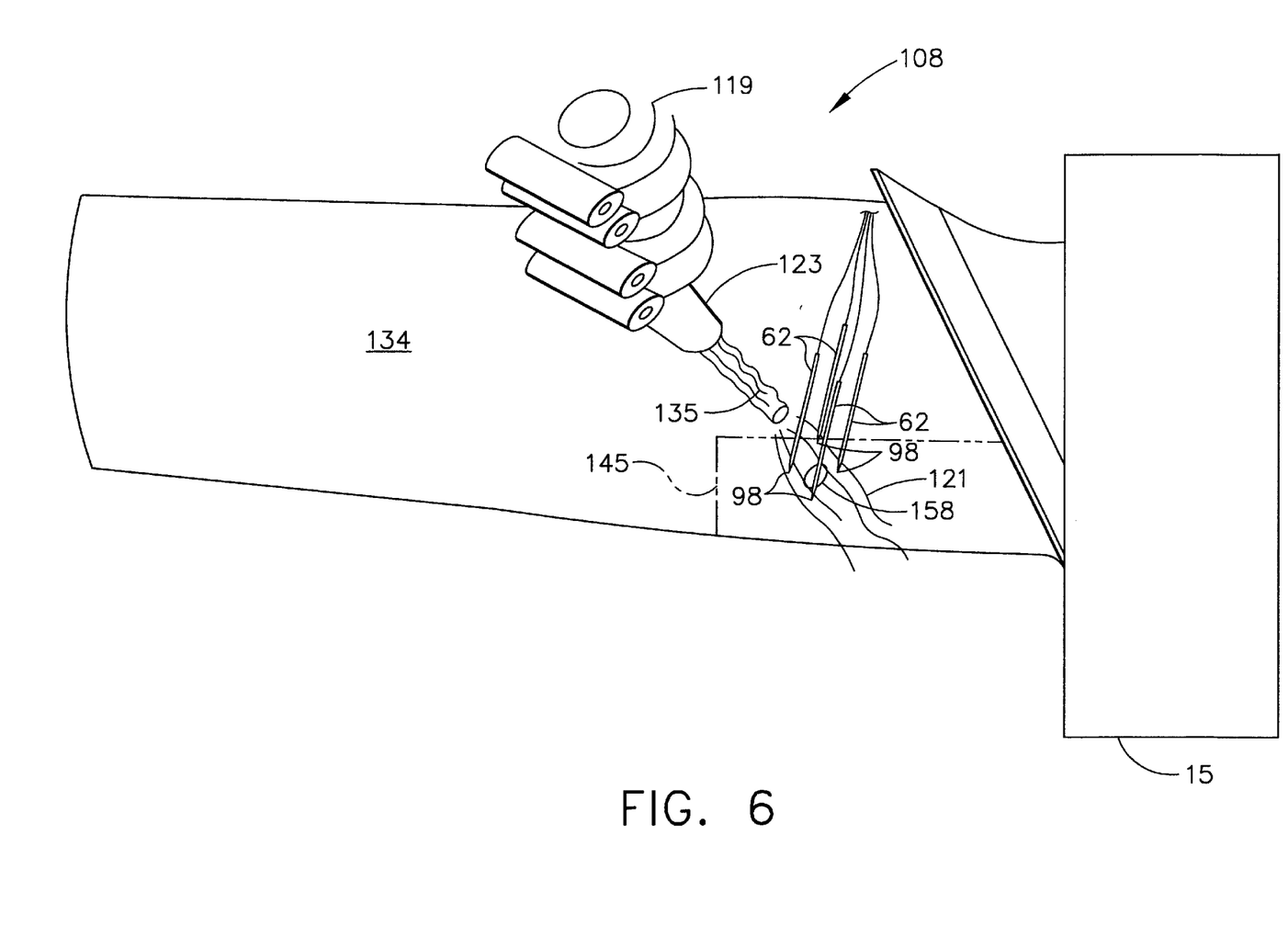
FIG. 6 is an enlarged partially diagrammatic perspective view illustration of an alternative embodiment of apparatus using multiple probes.
Figure 7:
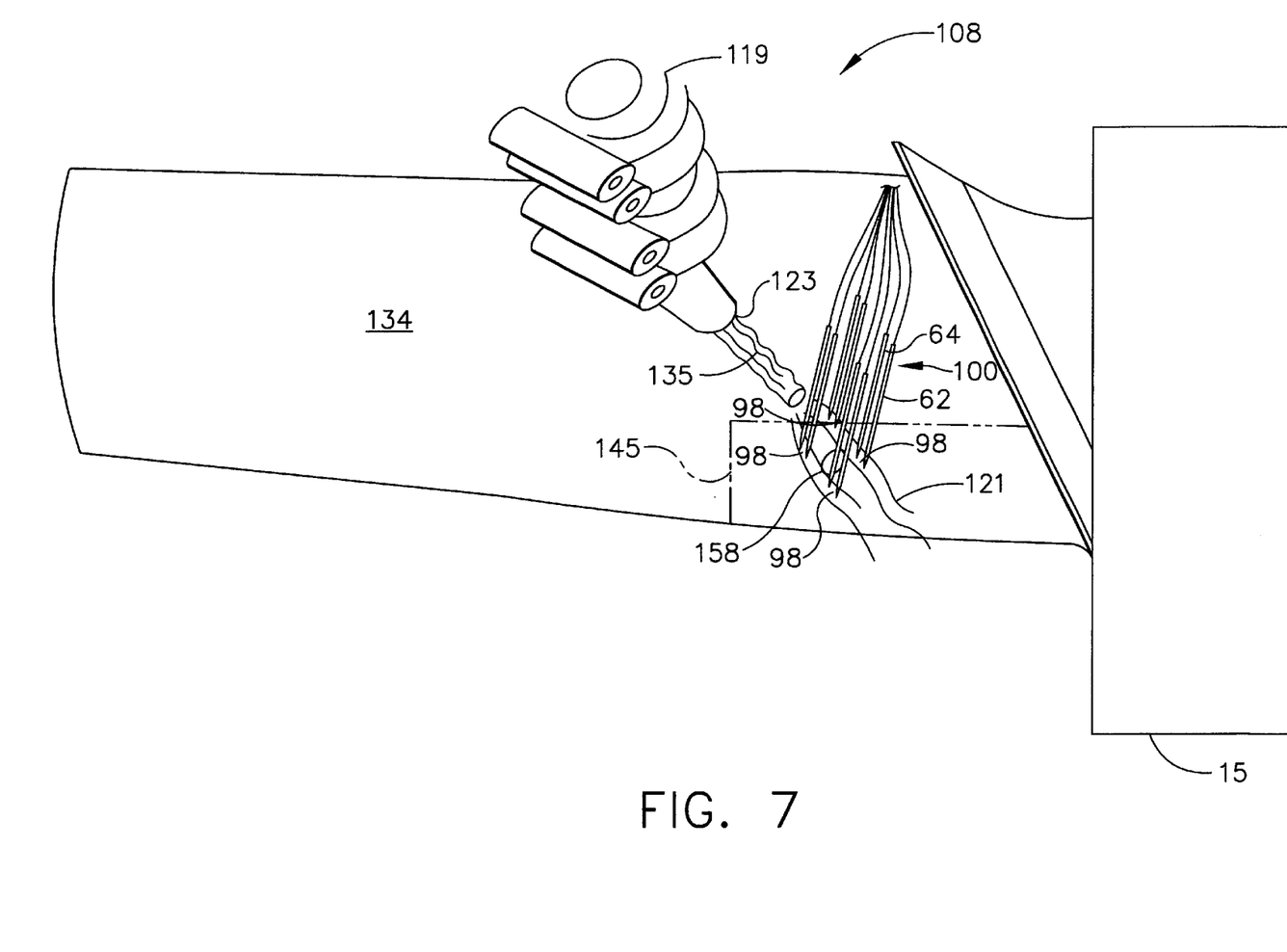
FIG. 7 is an enlarged partially diagrammatic perspective view illustration of an alternative embodiment of apparatus using multiple sets of probes.

Another alternative is to use two or more minimum level probes 62 at different locations 98 (illustrated as 4 probes at four locations) around where the laser shock peening spot 158 is located as illustrated in FIG. 6 or multiple sets 100 of minimum level and maximum level probes 62 and 64 as illustrated with the 4 sets of probes at the four different locations 98 in FIG. 7. The locations 98 are positioned at key locations in the curtain of flowing water 121 (on both sides of the workpiece such as the blade 108 for double-sided processing) to ensure that water coverage is adequate all over the surface portions that are being laser shock peened. One method of using the invention calibrates gaps between the probes and the blade 108 using shim stock, in the range of interest.

Figure 8:
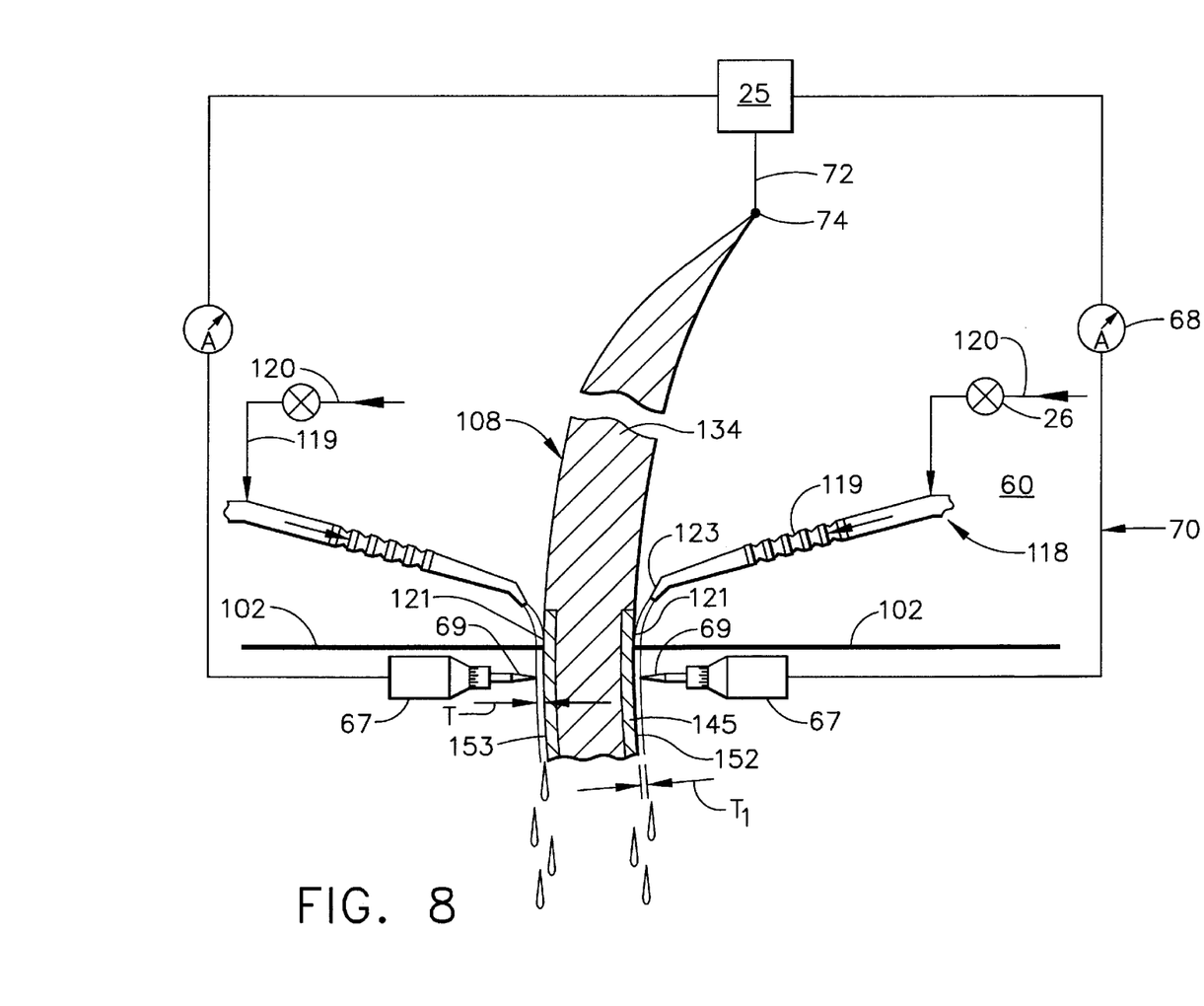
FIG. 8 is an enlarged partially diagrammatic and partially schematic illustration of another alternative embodiment of apparatus using a micrometer as a probe to measure and control thickness of the flow of water in the laser shock peening apparatus and method illustrated in FIG. 1.

Illustrated in FIG. 8 is the use of a micrometer 67 as the minimum level probes 62 in FIG. 3. The micrometer 67 can also be used as the maximum level probe 64 and to measure thickness T of the curtain of flowing water 121. The micrometer 67 is wired such that when a tip 69 of the micrometer contacts the blade 108 then the electrical circuit is completed as indicated by the first ammeter 68. As soon as the tip 69 of the micrometer 67 is retracted away from the blade 108, then the electrical circuit is broken as indicated by the first ammeter 68. The micrometer is an example of a distance setting and measuring means for measuring and setting or adjusting the distance between a tip of the probe and the surface over which the curtain of flowing water 121 (the confinement media) is flowed.

During set up of the process, the micrometer is initially adjusted until the electrical circuit is completed as indicated by the first ammeter 68 indicating electrical contact between the blade and the micrometer. An initial micrometer reading is noted and then the micrometer tip is retracted away from the blade target creating the desired gap between the micrometer tip and the blade which is either the minimum thickness T1 or the maximum thickness T2 depending on which probe the micrometer is being used for.

After the flow of water 121 is started and becomes stable, the micrometer can be used to determine the thickness of the layer of the flow of water. The micrometer is adjusted until the tip contacts the water layer and closes the circuit. A second micrometer reading is noted. The difference between the two values of micrometer readings is the water layer thickness. If the water layer thickness is different than the desired value, the water flow is adjusted until the desired value is reached.

While the preferred embodiment of the present invention has been described fully in order to explain its principles, it is understood that various modifications or alterations may be made to the preferred embodiment without departing from the scope of the invention as set forth in the appended claims.

What is claimed is:

1. A laser shock peening apparatus for laser shock peening a metallic surface portion on a workpiece through a laser transparent confinement media, said apparatus comprising:

a laser unit having at least one laser beam source for generating at least one laser beam and means for directing said beam through the confinement media, to the surface portion on the workpiece, a confinement media supply means for flowing the confinement media over the surface portion, a sensor means for sensing a thickness of the confinement media on the surface portion, a control means for controlling the laser shock peening based on a sensed thickness signal from said sensor means which is connected to said control means, and wherein said confinement media supply means further comprises a control valve controllably connected to said control means for controlling flow rate of the confinement media through said confinement media supply means based on the sensed thickness from said sensor means.

2. A laser shock peening apparatus for laser shock peening a metallic surface portion on a workpiece through a laser transparent confinement media, said apparatus comprising:

a laser unit having at least one laser beam source for generating at least one laser beam and means for directing said beam through the confinement media, to the surface portion on the workpiece, a confinement media supply means for flowing the confinement media over the surface portion, said confinement media supply means further comprising a control valve controllably connected to said control means for controlling flow rate of the confinement media through said confinement media supply means based on the sensed thickness from said sensor means, a sensor means for sensing a thickness of the confinement media on the surface portion, a control means for controlling the laser shock peening based on a sensed thickness signal from said sensor means which is connected to said control means, and said sensor means includes a first probe operable to sense a first thickness of the confinement media and said control means is operable for controlling flow rate of the confinement media through said confinement media supply means based on a first signal from said first probe.

3. An apparatus as claimed in claim 2 wherein said sensor means further comprises a first circuit including:

said first probe is an electrical conductor connected to an electrical power supply, and an electrical connection means for connecting the workpiece into said circuit such that said circuit is completed when the confinement media is flowed over the surface portion and contacts said first probe.

4. An apparatus as claimed in claim 3 wherein said first probe includes a micrometer.

5. A laser shock peening apparatus for laser shock peening a metallic surface portion on a workpiece through a laser transparent confinement media, said apparatus comprising:

a laser unit having at least one laser beam source for generating at least one laser beam and means for directing said beam through the confinement media, to the surface portion on the workpiece, a confinement media supply means for flowing the confinement media over the surface portion, said confinement media supply means further comprising a control valve controllably connected to said control means for controlling flow rate of the confinement media through said confinement media supply means based on the sensed thickness from said sensor means, a sensor means for sensing a thickness of the confinement media on the surface portion, a control means for controlling the laser shock peening based on a sensed thickness signal from said sensor means which is connected to said control means, and said sensor means including first and second sensors operable to sense first and second thicknesses respectively of the confinement media and said control means is operable for controlling flow rate of the confinement media through said confinement media supply means based on first and second signals from said first and second sensors.

6. An apparatus as claimed in claim 5 wherein said first and second sensors includes first and second probes that are electrical conductors operable to make electrical contacts through the confinement media to the metallic surface portion.

7. An apparatus as claimed in claim 6 wherein said sensor means further comprises independent first and second circuits including, said first and second probes respectively connected to electrical power supply, and an electrical connecting means for connecting the workpiece into said circuits such that respective ones of said circuits are completed when the confinement media is flowed over the surface portion and contacts respective ones of said probes.

8. A laser shock peening apparatus for laser shock peening a metallic surface portion on a workpiece through a laser transparent confinement media, said apparatus comprising:

a laser unit having at least one laser beam source for generating at least one laser beam and means for directing said beam through the confinement media, to the surface portion on the workpiece, a confinement media supply means for flowing the confinement media over the surface portion, a sensor means for sensing a thickness of the confinement media on the surface portion, and an indicating means connected to said sensor means to indicate that the thickness of the confinement media is below a predetermined first value.

9. An apparatus as claimed in claim 8 wherein said sensor means further comprises a first circuit including:

an electrical power supply, an electrically conducting first probe, said indicating means, and an electrical connection means for connecting the workpiece into said circuit such that said circuit is completed when the confinement media is flowed over the surface portion and contacts said first probe.

10. An apparatus as claimed in claim 9 wherein said indicating means is a visual indicator that indicates said circuit is or is not completed.

11. An apparatus as claimed in claim 9 wherein said indicating means is an ammeter.

12. An apparatus as claimed in claim 8 wherein said sensor means further comprises a plurality of circuits, each of said circuits including:

an electrical power supply, an electrically conducting probe, said indicating means, and an electrical connection means for connecting the workpiece into said first circuit such that said first circuit is completed when the confinement media is flowed over the surface portion and contacts said first probe.

13. An apparatus as claimed in claim 12 wherein said indicating means is a visual indicator that indicates said first circuit is or is not completed.

14. A method for laser shock peening a workpiece, said method comprising the following steps:

firing a laser beam with sufficient power to vaporize material on a surface portion of the workpiece to form a region having deep compressive residual stresses imparted by the laser shock peening process extending into the workpiece from the laser shock peened surface portion, flowing laser transparent confinement media over the surface portion upon which the laser beam is firing while firing the laser beam, sensing a thickness of the confinement media on the surface portion, and indicating the thickness of the confinement media is below a predetermined first value.

15. A method as claimed in claim 14 further comprising controlling the laser shock peening using the sensed thickness of the confinement media.

16. A method as claimed in claim 15 wherein controlling the laser shock peening further comprises controlling a flow rate of the confinement media over the surface portion.

17. A method as claimed in claim 16 wherein sensing the thickness of the confinement media comprises using a first probe to indicate a predetermined minimum thickness of the confinement media.

18. A method for laser shock peening a workpiece, said method comprising the following steps:

firing a laser beam with sufficient power to vaporize material on a surface portion of the workpiece to form a region having deep compressive residual stresses imparted by the laser shock peening process extending into the workpiece from the laser shock peened surface portion, flowing laser transparent confinement media over the surface portion upon which the laser beam is firing while firing the laser beam, sensing a thickness of the confinement media on the surface portion using a first probe to indicate a predetermined minimum thickness of the confinement media, controlling the laser shock peening using the sensed thickness of the confinement media, controlling the laser shock peening further comprises controlling a flow rate of the confinement media over the surface portion, and sensing the thickness of the confinement media further comprises using a second probe to indicate a predetermined maximum thickness of the confinement media.

19. A method for laser shock peening a workpiece, said method comprising the following steps:

firing a laser beam with sufficient power to vaporize material on a surface portion of the workpiece to form a region having deep compressive residual stresses imparted by the laser shock peening process extending into the workpiece from the laser shock peened surface portion, flowing laser transparent confinement media over the surface portion upon which the laser beam is firing while firing the laser beam, sensing a thickness of the confinement media on the surface portion by using a first probe to indicate a predetermined minimum thickness of the confinement media and using a second probe to indicate a predetermined maximum thickness of the confinement media, and controlling the laser shock peening by controlling a flow rate of the confinement media over the surface portion using the sensed thickness of the confinement media.

* * * * *